United States Patent
Wigren et al.

(10) Patent No.: US 9,307,420 B2
(45) Date of Patent: *Apr. 5, 2016

(54) LOAD ESTIMATION IN FREQUENCY DOMAIN PRE-EQUALIZATION SYSTEMS

(75) Inventors: Torbjörn Wigren, Uppsala (SE); Henrik Egnell, Uppsala (SE); Ari Kangas, Lidingö (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 426 days.

This patent is subject to a terminal disclaimer.

(21) Appl. No.: 13/876,099

(22) PCT Filed: Oct. 1, 2010

(86) PCT No.: PCT/SE2010/051054
§ 371 (c)(1),
(2), (4) Date: Mar. 26, 2013

(87) PCT Pub. No.: WO2012/044215
PCT Pub. Date: Apr. 5, 2012

(65) Prior Publication Data
US 2013/0308480 A1    Nov. 21, 2013

(51) Int. Cl.
*H03D 1/04* (2006.01)
*H04W 24/02* (2009.01)
(Continued)

(52) U.S. Cl.
CPC .............. *H04W 24/02* (2013.01); *H04B 1/7097* (2013.01); *H04B 17/345* (2015.01)

(58) Field of Classification Search
CPC .................................................... H04W 24/02
USPC ........................................................ 375/346
See application file for complete search history.

(56) References Cited

U.S. PATENT DOCUMENTS

| | | | |
|---|---|---|---|
| 8,670,478 B2 * | 3/2014 | Kangas et al. | 375/144 |
| 2003/0218974 A1 * | 11/2003 | Zuniga | 370/229 |
| 2007/0054619 A1 | 3/2007 | Kinnunen et al. | |

FOREIGN PATENT DOCUMENTS

| | | |
|---|---|---|
| WO | 2006076969 A1 | 7/2006 |
| WO | 2007024166 A1 | 3/2007 |

(Continued)

OTHER PUBLICATIONS

Wigren, T. et al. "Estimation of uplink WCDMA load in a single RBS." IEEE 66th Vehicular Technology Conference 2007, IEEE Conference Publications, Sep. 30-Oct. 3, 2007, pp. 1499-1503, Baltimore, MD, USA.

(Continued)

*Primary Examiner* — Lihong Yu
(74) *Attorney, Agent, or Firm* — Patents on Demand, P.A.; Brian K. Buchheit; Scott M. Garrett

(57) ABSTRACT

A method for noise rise estimation in a wireless communication system comprises measuring (210) of received total wideband power of an antenna a plurality of times. An estimate of a noise floor measure is computed (212) based on at least a number of the measured received total wideband powers of the antenna. Interference whitening of a received signal is performed (214) per user for a multitude of users. A useful signal power per user after the interference whitening, preferably Frequency Domain Equalization, is determined (216). A noise rise measure per user is calculated (220), based at least on the useful signal power per user and the noise floor measure. The calculation in turn comprises compensation of the noise rise measure per user for the effects of the interference whitening. An arrangement for noise rise estimation is adapted for such a method. A radio base station comprises such an arrangement.

20 Claims, 14 Drawing Sheets

(51) Int. Cl.
*H04B 1/7097* (2011.01)
*H04B 17/345* (2015.01)

(56) References Cited

FOREIGN PATENT DOCUMENTS

| WO | 2008039123 A1 | 4/2008 |
|---|---|---|
| WO | 2008097145 A1 | 8/2008 |
| WO | 2010144004 A1 | 12/2010 |
| WO | 2011031193 A1 | 3/2011 |
| WO | 2011071428 A1 | 6/2011 |
| WO | 2011155882 A1 | 12/2011 |

OTHER PUBLICATIONS

Fulghum, T. L. et al. "Adaptive Generalized Rake Reception in DS-CDMA Systems." IEEE Transactions on Wireless Communications, Jul. 2009, pp. 3464-3474, vol. 8, Issue 7, IEEE Communications Society.

Dahlman, E. et al. "3G Evolution HSPA and LTE for Mobile Broadband." Jul. 28, 2010, Section 5.1, pp. 66-71, Second Edition, Linacre House, Oxford, United Kingdom.

Bottomley, G. et al. "On the Equivalence of Chip Equalization and Generalized RAKE Reception." Ericsson Internal Technical Report, Jan. 6, 2004, pp. 1-15, EUS/G42-02:0140/REP, Revision B.

Cozzo, C. et al. "Capacity Improvement with Interference Cancellation in the WCDMA Enhanced Uplink." The 17th Annual IEEE International Symposium on Personal, Indoor and Mobile Radio Communications (PIMRC'06), pp. 1-5, 11-14 Sep. 2006.

Wigren, T. "Soft Uplink Load Estimation in WCDMA." IEEE Transactions on Vehicular Technology, vol. 58, No. 2, Feb. 2009.

Zhang, D. et al. "HSUPA Scheduling Algorithms Utilizing RoT Measurements and Interference Cancellations." IEEE ICC 2008, pp. 5033-5037, May 19-23, 2008.

* cited by examiner

US 9,307,420 B2

LOAD ESTIMATION IN FREQUENCY DOMAIN PRE-EQUALIZATION SYSTEMS

TECHNICAL FIELD

The present invention relates in general to methods and devices for estimation of power-related quantities in cellular communications systems and in particular to such methods and devices in cellular communications systems using interference whitening.

BACKGROUND

Wideband Code Division Multiple Access (WCDMA) telecommunication systems have many attractive properties that can be used for future development of telecommunication services. In order to retain stability of a cell, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements.

Since the Radio Base Station (RBS) tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the rise in the interference becomes large and the risk for instability, a so called power rush, increases. It is thus a necessity to schedule high capacity uplink channels, like the enhanced uplink (EUL) channel in WCDMA, so that one can insure that instability is avoided. In order to do so, the momentary load must be estimated in the RBS or any node connected thereto. This enables the assessment of the capacity margin that is left to the instability point.

One approach to improve load estimation is disclosed in the published international patent application WO 2006/076969. A minimum value of a power quantity, preferably a difference between the instantaneous total received wideband power and the instantaneous sum of powers of all links used in the same cell, is used as an estimate of an upper limit of the thermal noise floor, based on which a noise rise measure can be estimated. An optimal and soft algorithm for noise rise estimation based on a similar basic idea of minimum values is disclosed in the published international patent application WO 2007/024166.

To handle increasing uplink data rates, interference cancellation (IC) or interference suppression (IS) is being introduced in WCDMA. A conventional procedure to perform IC is summarized by the following steps. A channel model of the interferer to be cancelled is estimated. This does not cause any additional operations, since this channel model is anyway needed. The transmitted signal of the interferer to be cancelled is also decoded. This is also anyway needed. A replica of the received signal of the interferer to be cancelled is then created, by use of the channel model and the decoded signal. This replica may e.g. be reconstructed as an IQ chip stream. The replica of the interfering signal is subsequently subtracted from the received signal of the user to be decoded, thereby hopefully reducing the remaining power of the interferer to very low power levels.

This procedure obviously affects the load measurement functionality of the WCDMA EUL. Thus, the scheduler must be aware of the instantaneous uplink load in several signal points of any IC receiver structure in order to be able to utilize the entire amount of resources. Unless such load estimates are made available it will not be possible to exploit the link gains fully, when scheduling EUL users. In the published international patent application WO 2008/097145, load estimation with IC of this conventional type is handled in analogy with earlier noise rise estimation procedures.

Another approach to limit the effect of interference is to use some kind of interference whitening approaches. Minimum mean square error (MMSE) Frequency Domain Equalization (FDE) is a common technique to combat frequency selectivity in wideband channels, like in the WCDMA uplink. The interference whitening is performed for each user separately. The main advantage associated with FDE is a relatively low complexity. The advantages come with a price due to the fact that linear convolutions are replaced by circular convolutions when going to the frequency domain.

In order to utilize the reduced interference provided by the FDE, the load estimations have to be performed taking the interference whitening of the FDE into account. However, in contrary to what is valid for interference cancellation based on regeneration and subtraction, the thermal noise floor is changed in the same manner as the interference reduction obtained by the FDE process, and can no longer be treated as constant after interference whitening. A treatment analogue of WO 2008/097145 can therefore not be used for achieving a noise rise estimation, the reason being that WO 2008/097145 requires the noise floor to be constant. There is thus a problem of using the created reduced interference, since no reliable noise rise estimation is available.

SUMMARY

An object of the present invention is thus to provide methods and arrangements for providing reliable noise rise estimations in wireless communication systems using interference whitening methods operating per user, such as the FDE.

The object is achieved by methods and arrangements according to the enclosed independent patent claims. Preferred embodiments are defined by the dependent claims. In general, in a first aspect, a method for noise rise estimation in a wireless communication system comprises measuring of received total wideband power of an antenna a plurality of times. An estimate of a noise floor measure is computed based on at least a number of the measured received total wideband powers of the antenna. Interference whitening of a received signal is performed per user for a multitude of users. A useful signal power per user after the interference whitening is determined. A noise rise measure per user is calculated, based at least on the useful signal power per user and the noise floor measure. The calculation in turn comprises compensation of the noise rise measure per user for the effects of the interference whitening.

In a second aspect, an arrangement for noise rise estimation in a wireless communication system comprises a front end signal conditioner, an interference whitener, and a processor. The interference whitener is connected to the front end signal conditioner and is configured for providing interference whitening of a plurality of user signals of the front end signal at an output. The processor is connected to the front end signal conditioner and to the output from the interference whitener. The processor is configured for measuring received total wideband power received at the front end signal conditioner from an antenna a plurality of times and for computing an estimate of a noise floor measure based on at least a number of the measured received total wideband powers of the antenna. The processor is further configured for determining a useful signal power per user on the output from the interference whitener and for calculating a noise rise measure, based at least on the useful signal power per user and the noise floor measure. The noise rise measure is compensated for the interference whitening.

In a third aspect, a radio base station of a wireless communication system comprises an arrangement for noise rise estimation according to the second aspect.

One advantage with the present invention is that the reduced interference levels achieved by e.g. FDE can be fully utilized to increase the total available capacity of a wireless communication system.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
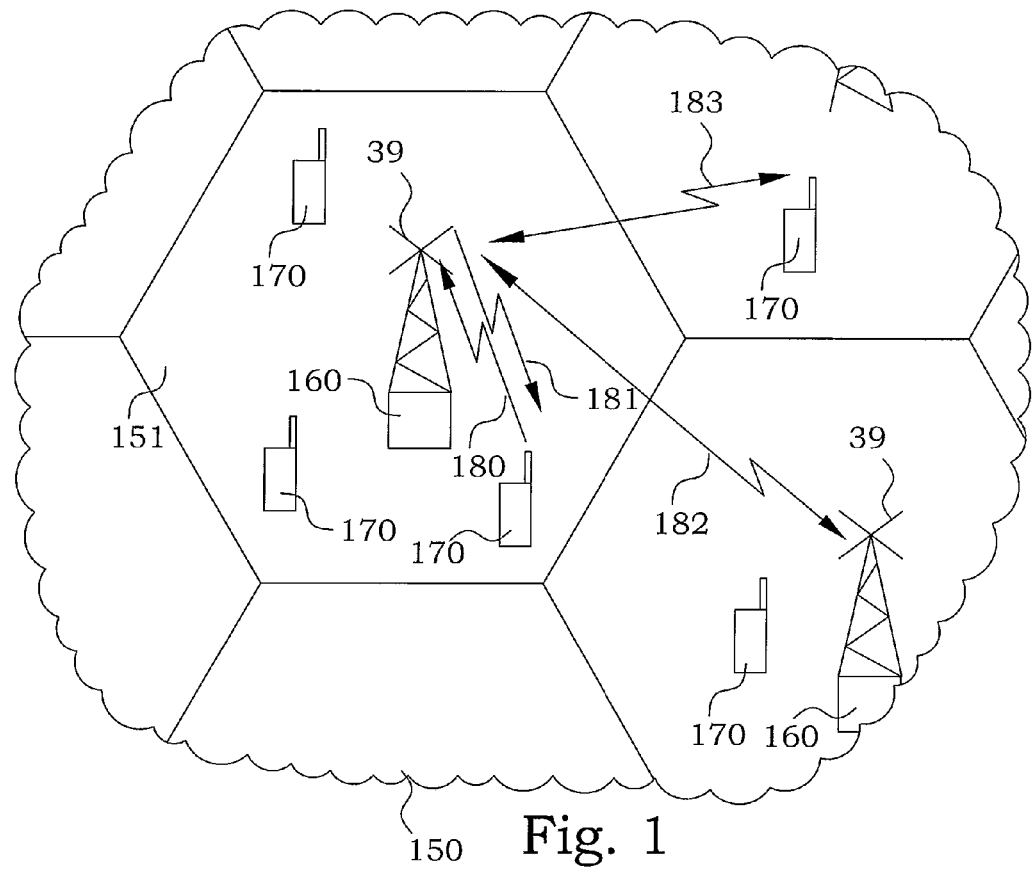
FIG. 1 is a schematic illustration of a wireless communication system.

Throughout the entire disclosure, bold letters in equations refer to vector or matrix quantities.

In the drawings, corresponding reference numbers are used for similar or corresponding parts.

The present invention relates to arrangements and methods in wireless communication systems. FIG. 1 illustrates a schematic view of an embodiment of such a wireless communication system 150. A radio base station 160 communicates via its antenna/antennas 39 with a multitude of user equipments (UE) 170 situated within a cell 151 of the wireless communication system 150. Radio signals transmitted from the RBS 160 to the UEs 170 are denoted as downlink signals 181, and radio signals transmitted from the UEs 170 to the RBS 160 are denoted as uplink signals 180. This invention mainly considers the uplink signals, whereby arrangements for noise rise estimation typically are provided in the RBS 160. Besides the intentional uplink signals 180, the RBS 160 also receives interfering signals 182, 183. A radio base station 160 of a wireless communication system 150 of such configuration may comprise an arrangement for noise rise estimation according to the description here below.

In order to understand the solved problems and advantages with the present invention, a short summary of prior art load estimation principles are presented as a background. Without IC, the load at an antenna connector is given by the noise rise, or rise over thermal (RoT), RoT(t), defined by:

$$RoT(t) = \frac{RTWP(t)}{N(t)}, \quad (1)$$

where $N(t)$ is the thermal noise level as measured at the antenna connector. The RTWP(t) is unaffected by any despreading applied. It remains to define what is meant with RTWP(t). The definition used here is simply the total wideband power:

$$RTWP(t) = \sum_{k=1}^{K} P_k(t) + I^N(t) + N(t), \quad (2)$$

also measured at the antenna connector. Here $I^N(t)$ denotes the power as received from neighbour cells ($^N$) of the WCDMA system. As will be seen below, the major difficulty of any RoT estimation algorithm is to separate the thermal noise power from the interference from neighbour cells.

Another specific problem that needs to be addressed when determining the load is that the signal reference points are, by definition, at the antenna connector. The measurements are however obtained after the analogue signal conditioning chain. The analogue signal conditioning chain does introduce a scale factor error of about 1 dB (1-sigma) that is difficult to compensate for. Fortunately, all powers of (2) are equally affected by the scale factor error so when (1) is calculated, the scale factor error is cancelled as $$RoT^{Digital\ Receiver}(t) = \quad (3)$$

$$\frac{RTWP^{Digital\ Receiver}(t)}{N^{Digital\ Receiver}(t)} = \frac{\gamma(t)RTWP^{Antenna}(t)}{\gamma(t)N^{Antenna}(t)} = RoT^{Antenna}(t).$$

In order to understand the fundamental problem of neighbour cell interference when performing load estimation, note that $$I^N(t)+N(t)=E[I^N(t)]+E[N(t)]+\Delta I^N(t)+\Delta N(t) \quad (4)$$

where E[ ] denotes mathematical expectation and where $\Delta$ denotes the variation around the mean. The fundamental problem can now be clearly seen. Since there are no measurements available in the RBS that are related to the neighbour cell interference, a linear filtering operation can at best estimate the sum $E[I^N(t)]+E[N(t)]$. This estimate cannot be used to deduce the value of $E[N(t)]$. The situation is the same as when the sum of two numbers is available. Then there is no way to figure out the values of the individual numbers. This issue is analysed rigorously for the RoT estimation problem in published international patent application WO 2007/024166 where it is proved that the noise power floor is not mathematically observable.

Figure 2:
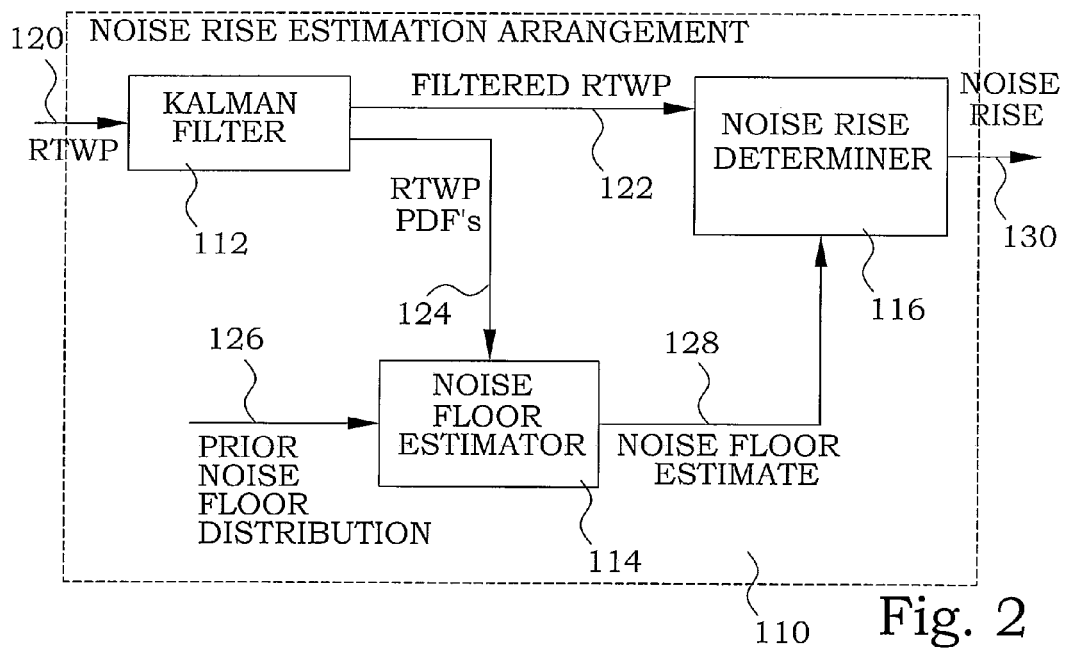
FIG. 2 is a schematic illustration of a noise rise estimation arrangement.

An embodiment of the RoT estimation algorithm currently in use is depicted in FIG. 2. It is described in detail in the published international patent application WO 2007/024166. The algorithm estimates the RoT, as given by (1). The main problem solved by the estimation algorithm is the accurate estimation of the thermal noise floor N(t). Since it is not possible to obtain exact estimates of this quantity due to the neighbour cell interference, the estimator therefore applies an approximation, by consideration of the soft minimum as computed over a relative long window in time.

In particular, an arrangement 110 for noise rise estimation in a wireless communication system is supplied with RTWP measurements 120. The RTWP measurements 120 are used in a Kalman filter 112 to produce filtered estimates 122 of the RTWP as well as probability density functions 124 of the RTWP. These probability density functions 124 are provided to a noise floor estimator 114, in which noise floor estimates 128 are provided with knowledge of a prior noise floor distribution 126. The noise floor estimator 114 operates preferably with a sliding window algorithm. The noise floor estimates 128 and the filtered estimates 122 of the RTWP are provided to a noise rise determiner 116, producing an output of a noise rise measure, in this embodiment a RoT value 130.

It is important to understand that this estimation relies on the fact that the noise floor is constant over very long periods of time (disregarding the small temperature drift).

The sliding window algorithm of the above section has the disadvantage of requiring a large amount of storage memory. This becomes particularly troublesome in case a large number of instances of the algorithm are needed, as may be the case when IS/IC is introduced in the uplink. To reduce the memory consumption a recursive algorithm was disclosed in the published international patent application WO 2007/0055626. That algorithm reduces the memory requirements of the sliding window scheme discussed above at least by a factor of 100. The invention disclosed here is applicable both to the sliding window RoT estimation algorithm and the recursive algorithm.

Figure 3:
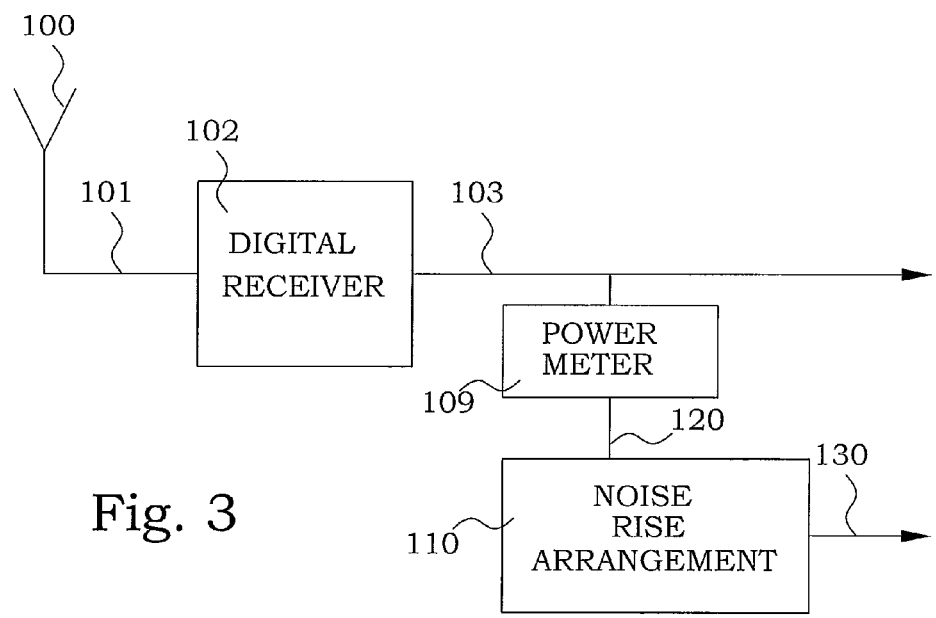
FIG. 3 is a schematic illustration of a receiver chain including a noise rise arrangement.

FIG. 3 schematically illustrates the arrangement 110 for noise rise estimation in relation to the receiver chain. An antenna 100 receives electromagnetic signals and gives rise to a received analogue signal 101, which is provided to a digital receiver 102. The digital receiver 102 provides a stream of digital signals 103 representative to the analogue signals, however, as mentioned above modified with a certain scale factor. A measurement unit 109 is connected to the stream of digital signals 103 and performs measurements of received total wideband powers 120, which are handed on to the arrangement 110 for noise rise estimation.

Figure 4:
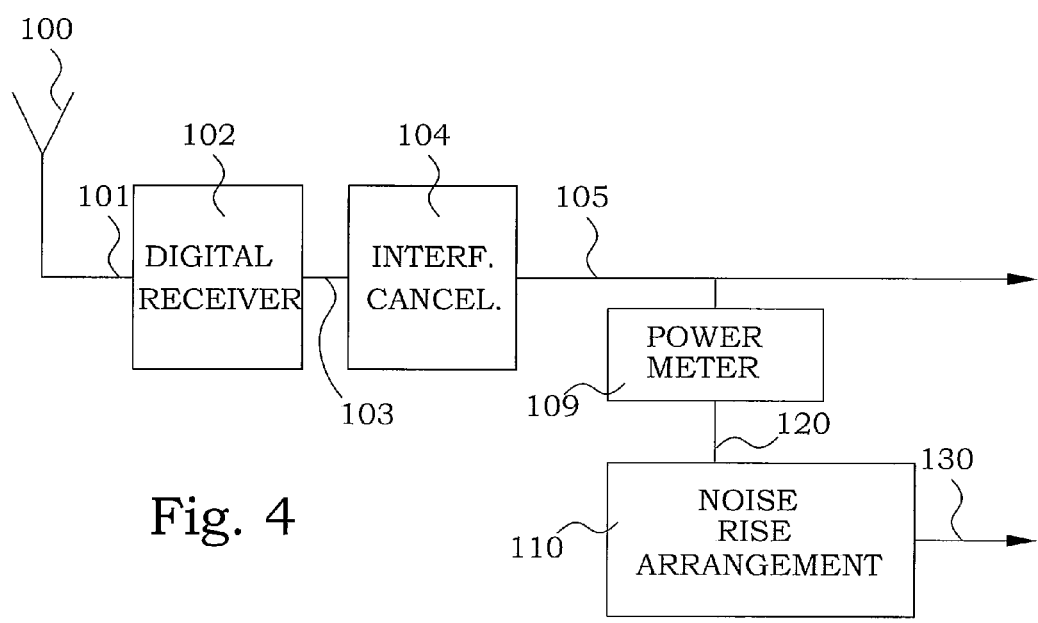
FIG. 4 is a schematic illustration of a receiver chain including interference cancellation and a noise rise arrangement.

As mentioned in the background section, different interference cancellation methods based on regeneration and subtraction are often used. This is schematically illustrated in FIG. 4. The stream of digital signals 103 is provided to an interference canceller 104, where signals not intended for a particular user are removed. An interference cancelled digital signal 105 intended for a particular user is provided as output. As also mentioned before, load estimation can be applied also to such interference cancelled digital signal 105, where the measured RTWP measure refers to the digital signal after interference cancelling. For IC with regeneration and subtraction there is no change of the scale factor for the thermal noise power floor. The consequence is that the RoT estimation algorithms are still applicable in this case, since a constant noise power level is estimated.

It is important to observe that the effect of this procedure is different for different users, since an interferer is a user on its own. The consequence for load estimation is that there is no longer a uniform way to look on the interference of the WCDMA uplink. The load instead becomes individual for each user.

Finally notice that IC with regeneration and subtraction is more straightforward than with FDE since there is no change of the thermal noise power floor. The consequence is that the RoT estimation algorithms are still applicable in this case, since a constant noise power level is estimated.

The present invention provides solutions where load estimations reflect the reduced interference experienced by exploiting interference whitening in connection with the front end signal conditioner of the receivers. The load exploiting e.g. FDE can be estimated.

The present invention disclosure is focused on FDE. However, also interference whitening systems being applied in direct connection to the front end signal conditioner for each user separately can be configured in a similar manner.

Figure 5A:
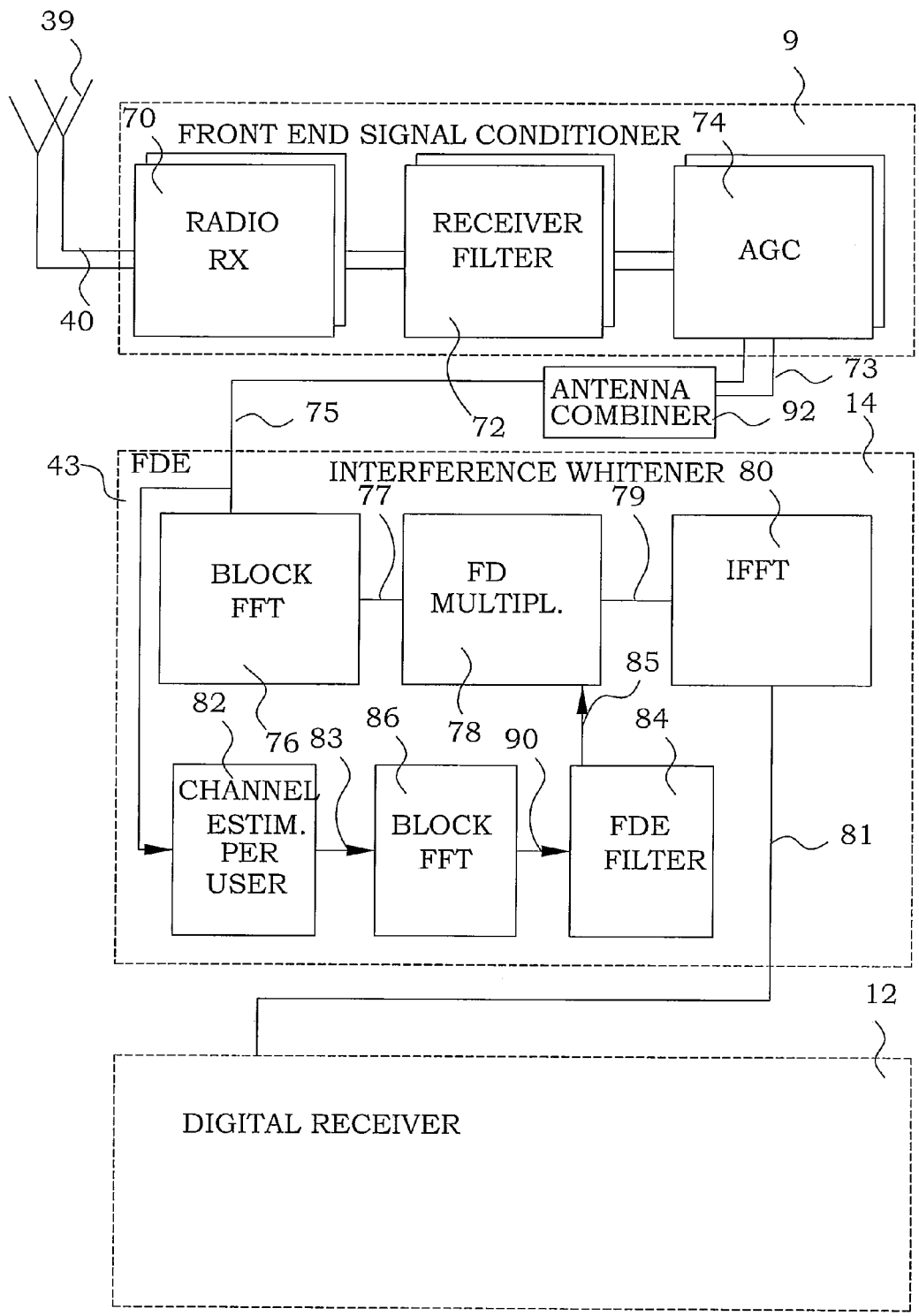
FIGS. 5A-B are schematic views of FDE systems.

In order to fully understand the main benefits of the invention, a short review of Frequency Domain Equalization (FDE) as such is first given. An embodiment of a general FDE receiver structure is depicted in FIG. 5A. A multiple of antennas 39 provides signals 40 to a radio receiver 70 of a front end signal conditioner 9. The front end signal conditioner 9 typically also comprises a receiver filter 72 and an Automatic Gain Control (AGC) function. The signals 73 output from the front end signal conditioner 9 are provided via an antenna combiner 92, in which the signals from the individual antennas are combined into one common signal 75, to an interference whitener 14, in this embodiment a FDE unit 43.

The FDE unit 43 performs equalization and interference suppression in the frequency domain. To explain this in detail, the following time domain signal model can be used:

$$v(t) = \sum_{l=0}^{L-1} h(l)z(t-l) + i(t) + n^{thermal}(t). \qquad (5)$$

Here, v is the received signal (vector due to multiple antennas), h is the radio channel net response, z is the desired (transmitted) signal, i(t) is the interference and $n^{thermal}(t)$ denotes the thermal noise. t denotes discrete time.

The FDE unit 43 comprises a block FFT (Fast Fourier Transform) 76 for transforming the incoming signal 75 of a time domain as described above into a signal 77 in the frequency domain. This signal can be modelled by taking the Fourier transform of (5), resulting in:

$$V(m) = H(m)Z(m) + I(m) + N^{thermal}(m), \qquad (6)$$

where the quantities are the discrete Fourier transform of the corresponding quantities in (5).

Now a Minimum Mean Square Error (MMSE) estimation can be performed on V(m). For this purpose, the common signal 75 is also provided to a channel estimator per user 82, which unscramble the common signal 75 by use of pilot signals to extract signals for each user and performs a channel estimation for each user. The channel estimation results in the determination of the radio channel net response 83, also referred to as h(l) in eq. (5) above. In the present embodiment, the radio channel net response 83 is supplied to a block FFT 86, providing a corresponding sampled channel frequency response vector 90, also referred to as H(m) in eq. (6) above. MMSE filter coefficients 85 (W(m)) are computed in a FDE filter 84 of the frequency domain, in this embodiment as:

$$W(m) = H^H(m)(H(m)H^H(m) + I(m)I^H(m) + (N^{thermal}(m)^H N^{thermal}(m))^{-1} \qquad (7)$$

where the thermal noise power floor matrix estimate $N^{thermal}(m)$ can be obtained by any algorithms of the prior art.

Finally, the equalized signal 79 ($Z_{FDE}(m)$) in the frequency domain is computed by a frequency domain multiplicator 78, operating at the signal 77 in the frequency domain V(m) by the MMSE filter coefficients 85 according to:

$$Z_{FDE}(m) = W(m)V(m) \qquad (8)$$

This constitutes an interference whitening process. In other words, the use of the MMSE filter coefficients makes the spectrum of the signal more flat, thereby reducing any spectral peaks. As a consequence the interference level is improved as well. The equalized signal 79 is provided to an IFFT (Inverse Fast Fourier Transform) unit 80 for transforming the signal back into a signal 81 $z_{FDE}(t)$ of the time domain. The so interference whitened signal 81 is then provided to the digital receiver 12. The FDE is also sometimes classified as an IS (interference suppression) technique.

There are some advantages associated with this structure. The FDE structure gives significant IS gains. Processing blocks are inserted in the uplink receiver structure that is already in place for other purposes, thereby reducing development costs. The fast Fourier transform (FFT) accelerator hardware developed for the Long Term Evolution (LTE) cellular system can be reused, thereby creating further synergies.

Figure 5B:
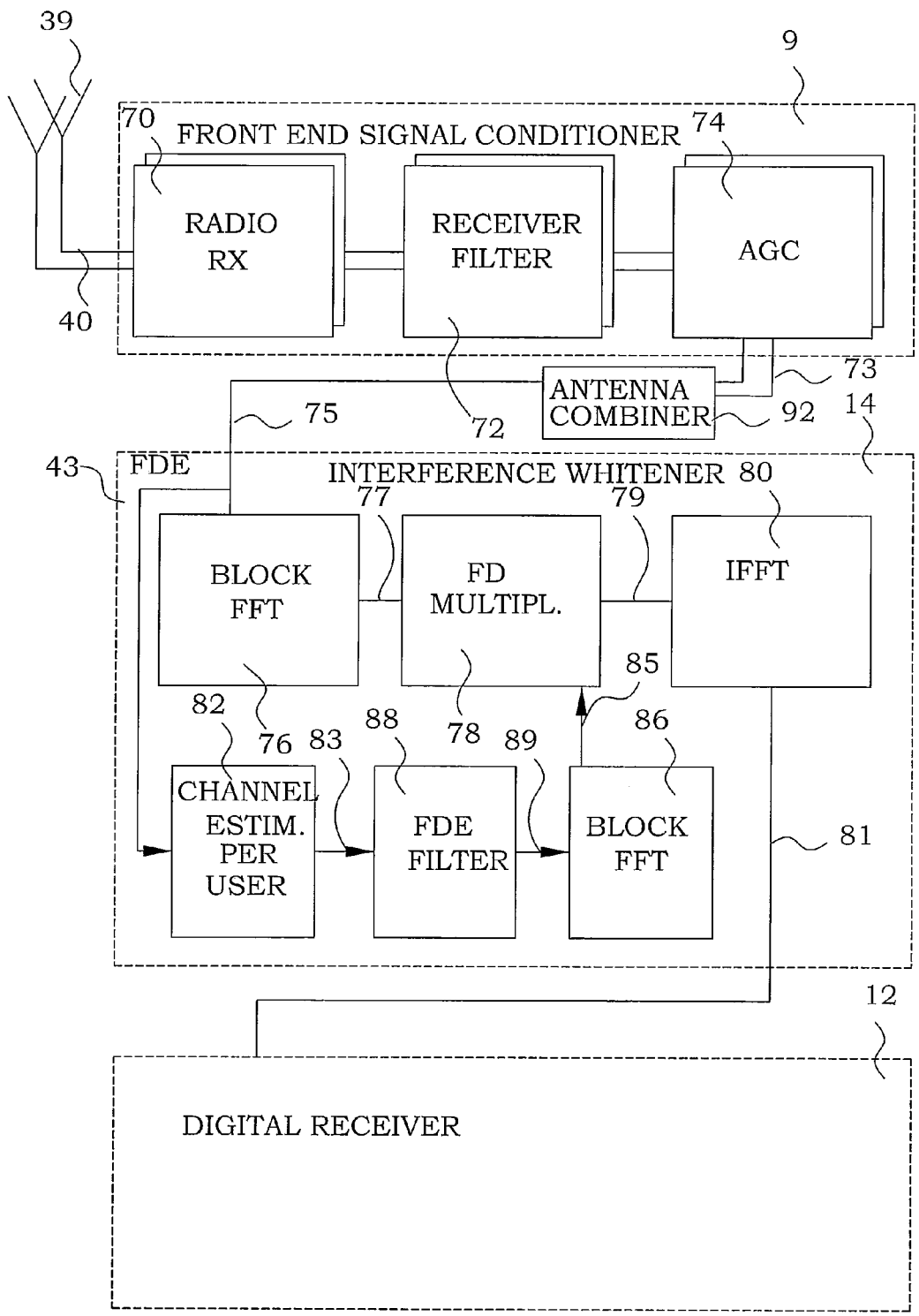

FIG. 5B illustrates another embodiment of a general FDE receiver structure. In this embodiment, the radio channel net response 83, (h(l)) is provided to a FDE filter 88. The FDE filter 88 is thus a filter operating in the time domain. This filtering is possible to perform, but is presently considered to be computationally more complex than the FDE filter of FIG. 5A. The FDE filter 88 provides MMSE filter coefficients 89 (w(l)), however, now in the time domain. A block FFT 86 is then utilized to transform the MMSE filter coefficients 89 of the time domain into MMSE filter coefficients 85 (W(m)) of the frequency domain in order to be used in the equalizing multiplication. It is thus possible, however, presently not assumed preferable, to make the filter operations in the time domain while the actual equalization takes place in the frequency domain.

The FDE is a user-dependent processing, which makes it necessary to perform it for all users, exploiting the estimated channel model for each user. Hence, to reduce the computational complexity, the wideband received signal is transformed to the frequency domain where the actual equalizing takes place. The signal is then transformed back to the time domain where it is further processed for each user in the digital receiver. The FFT and IFFT blocks have low computational complexity and are preferably implemented in HW.

The problems with existing load estimation solutions compatible with the FDE receive structure, known in public prior art, is that they do not reflect the reduced interference after FDE processing. They typically overestimate the air-interface load of the uplink and thereby they cause under-scheduling in the RBS, which in turn results in a too low throughput and/or capacity. It can also cause blocking in the admission control function in the RNC, which also results in reduced throughput or capacity. Prior art load estimation solutions cannot estimate the noise power floor after the FDE processing, since the noise power floor after FDE processing varies with the same rate as the frame rate of the FDE processing. The noise floor estimation instead requires a long time stability.

The present invention discloses means for uplink load estimation that reflects the gain in terms of reduced load of the FDE receiver step, as experienced after FDE. A further property of the invention is that the scale factor that scales the thermal noise power floor, which scale factor is caused by the FDE receiver step itself, is computed from properties of the FDE step. This in turn enables a compensation for the scaling. Thereby the present invention discloses ways to estimate the thermal noise power level. This is the key to the computation of the RoT, as experienced after FDE. The processing is individual for each user that hence experience different load. The user individual load measures are combined to a single load measure which is valid for the WCDMA uplink of the cell. The information is used in the EUL scheduler of the RBS, to enhance the scheduled number of users and/or throughput of the EUL air-interface. The information is also typically signaled to the SRNC where it can be used for load based admission control. The admission control will then also become responsive the FDE IS gains.

Figure 6A:
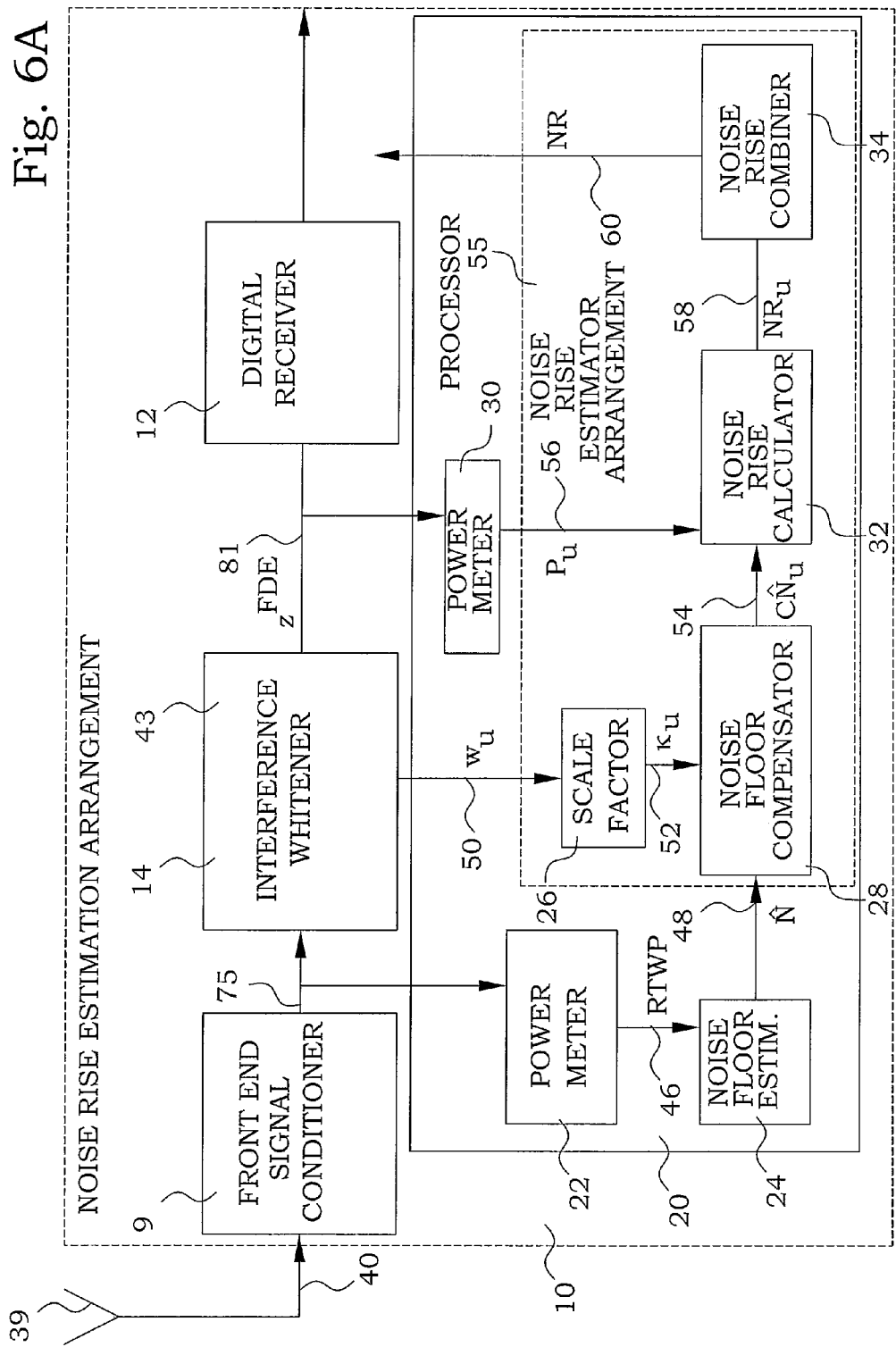
FIGS. 6A-E are schematic illustrations of embodiments of noise rise estimation arrangements according to the present invention.

An embodiment of an arrangement 10 for noise rise estimation in a wireless communication system according to an embodiment of the present invention is schematically illustrated in FIG. 6A. The arrangement 10 for noise rise estimation comprises an antenna system 39. The signal 40 from the antenna system is received in a front end signal conditioner 9, typically performing sampling, filtering and similar processes. The front end signal conditioner 9 looks typically as illustrated in FIG. 5A or 5B. The signal 75 output from the front end signal conditioner 9 is a digital signal, typically consisting of multiple channels. The arrangement 10 for noise rise estimation comprises an interference whitener 14, a digital receiver 12, and a processor 20. The interference whitener 14 is connected to the front end signal conditioner 9 for receiving digital signals 75 therefrom. The interference whitener 14 is in the present embodiment an FDE 43. The interference whitener 14 is thus intended for providing interference whitening of a plurality of user signals of said front end signal at an output, providing interference whitened digital signals 81. This may e.g. be performed according to the principles illustrated in FIG. 5B. These interference whitened digital signals 81 are provided to the digital receiver 12.

Again with reference to FIG. 6, the processor 20 is connected to the output from the front end signal conditioner 9 and to the output from the interference whitener 14. Furthermore, the processor 20 is connected to receive information about the interference whitening process from the interference whitener 14. The processor has a power meter 22, configured for measuring received total wideband power 46 (RTWP) of the signals 75 from an antenna received from the front end signal conditioner 9 a plurality of times. These measured received total wideband powers 46 are provided at an output from the power meter 22. The processor 20 has further a noise floor estimator 24 connected to the output of the power meter 22. The noise floor estimator 24 is configured for computing an estimate of a noise floor measure 48 based on at least a number of the measured received total wideband powers 46 of an antenna.

The signal after FDE can be expressed in mathematical terms. Using (6) and (8) results in:

$$Z_{FDE}(m) = w(m)H(m)z(m) + w(m)I(m) + W(m)N^{thermal}(m). \qquad (9)$$

Here $Z_{FDE}(m)$ denotes the pre-equalized wideband signal in the frequency domain, W(m) denotes the wideband MMSE equalizing filter in the frequency domain, H(m) denotes the wideband net channel response in the frequency domain, Z(m) denotes the wideband transmitted signal in the frequency domain, I(m) denotes the wideband neighbor cell interference in the frequency domain and $N^{thermal}(m)$ denotes the wideband thermal noise floor signal in the frequency domain. All signals are vector valued. The equation (9) is readily transformed to the time domain with an inverse discrete Fourier transformation, rendering:

$$z_{FDE}(t) = (wh)(t)*z(t) + w(t)*w(t)*n^{thermal}(t) \qquad (10)$$

where the star denotes (multi-dimensional) convolution, $z_{pre}(t)$ denotes the equalized wideband signal in the time domain, w(t) denotes the wideband finite impulse response of the equalizing filter in the time domain, h(t) denotes the wideband finite impulse response net channel response in the time domain, z(t) denotes the wideband transmitted signal in the time domain, i(t) denotes the wideband neighbor cell interference in the time domain and $n^{thermal}(t)$ denotes the wideband thermal noise floor signal in the time domain.

Furthermore, in an arrangement utilizing interference whitening, e.g. FDE, the load after the interference whitening is of interest. To obtain a measure of the load after the FDE interference whitening, the RoT after this step has to be considered. The RoT measure after the FDE processing is mathematically given by:

$$RoT^{FDE}(t) = \frac{z_{FDE}^H(t)z_{FDE}(t)}{E[(w(t)*n^{thermal}(t))^H(w(t)*n^{thermal}(t))]}. \quad (11)$$

Since the FDE influences the different users differently, note that this expression is valid for each separate user, and the index u has been omitted for readability reasons. With the user specificity, the expression (11) would be written like:

$$RoT_u^{FDE}(t) = \frac{z_{FDE,u}^H(t)z_{FDE,u}(t)}{E[(w_u(t)*n^{thermal}(t))^H(w_u(t)*n^{thermal}(t))]}. \quad (11a)$$

The numerator of (11) can be computed. Noting that the time scale for the RoT measurement in WCDMA is normally a transmission time interval (TTI), it follows that the numerator of (11) can be computed e.g. by an average of time samples over the TTI of interest (typically 2 ms or 10 ms).

To this end, the processor 20 of the present embodiment also comprises a power meter 30 connected to the output of the interference whitener 14. The power meter 30 is configured for determining a useful signal power per user 56 $P_u$ of the interference whitened signal 81 on the output from the interference whitener 14. The useful signal power per user 56 $P_u$ corresponds to the numerator of (11).

The computation of the denominator of (11) requires an evaluation of the expectation of that expression. This can be done assuming the thermal noise to be white and stationary, which is a standard assumption. Note that the evolution here therefore is performed over the time interval where the pre-equalization filter remains constant. It then follows that:

$$E\left[(w(t)*n^{thermal}(t))^H(w(t)*n^{thermal}(t))\right] = \quad (12)$$

$$E\left[\sum_{l_1=0}^{L-1}(n^{thermal}(t-l_1))^H w^H(l_1)\sum_{l_2=0}^{L-1}w(l_2)n^{thermal}(t-l_2)\right] =$$

$$E\left[\left(\sum_{l_1=0}^{L-1}\sum_{l_2=0}^{L-1}(n^{thermal}(t-l_1))^H w^H(l_1)w(l_2)n^{thermal}(t-l_2)\right)\right] =$$

$$E\left[\sum_{l_1=0}^{L-1}\sum_{l_2=0}^{L-1}w^H(l_1)w_e(l_2)(n^{thermal}(t-l_1))^H n^{thermal}(t-l_2)\right] =$$

$$\sum_{l_1=0}^{L-1}\sum_{l_2=0}^{L-1}w^H(l_1)w(l_2)E\left[(n^{thermal}(t-l_1))^H n^{thermal}(t-l_2)\right]$$

$$\sum_{l_1=0}^{L-1}\sum_{l_2=0}^{L-1}w^H(l_1)w_e(l_2)\delta_{l_1,l_2}\sum_{a=1}^{A}\hat{N}_a^{thermal} =$$

$$\left(\sum_{l=0}^{L-1}w^H(l)w(l)\right)\left(\sum_{a=1}^{A}\hat{N}_a^{thermal}\right).$$

In (12) $\hat{N}_a^{thermal}$ denotes the estimated thermal noise floor of antenna branch a, before pre-equalization. This means that prior art noise floor estimation algorithms mentioned in the background can be re-used. One algorithm is needed for each antenna branch if multiple antenna branches are present, which will be further discussed in later embodiments.

Combining (12) and (13) results in a load estimate:

$$RoT^{FDE} = \frac{z_{FDE}^H(t)z_{FDE}(t)}{\left(\sum_{l=0}^{L-1}W^H(l)w(l)\right)\left(\sum_{a=1}^{A}\hat{N}_a^{thermal}\right)}. \quad (13)$$

Also this load estimate is determined per user and with the explicit user specificity, the expression (13) would be written like:

$$RoT_u^{FDE} = \frac{z_{FDE,u}^H(t)z_{FDE,u}(t)}{\left(\sum_{l=0}^{L-1}w_u^H(l)w_u(l)\right)\left(\sum_{a=1}^{A}\hat{N}_a^{thermal}\right)}. \quad (13a)$$

The quantities above should be computed as averages or estimates over a time interval where the equalizing filter of the FDE remains constant. Since the total received wideband power is summed over all antenna branches, so is the thermal noise power floor. The RoT after FDE is also scaled with the power of the equalizing filter.

In view of the above, the processor 20 of the present embodiment comprises a noise rise estimator arrangement 55, i.e. the processor is further configured for calculating a noise rise measure. This noise rise measure is based at least on the useful signal power per user 56 $P_u$ and the noise floor measure 48. The noise rise estimator arrangement 55 and therefore the processor 20 is further configured for compensating the so obtained noise rise measure for the interference whitening. As will be seen in connection with the different embodiments, the noise rise estimator arrangement 55 may be configured in different ways.

The processor 20 is in this embodiment configured for compensating the estimate of a noise floor measure 48 $\hat{N}$ for the effects of the interference whitening into an equivalent noise floor measure 54 $C\hat{N}_u$. Such equivalent noise floor measure corresponds to the denominator of (13a) and will thus be specific for each user, since the effects of the interference whitening is user specific. To that end, the processor 20 comprises a scale factor determiner 26, connected to the interference whitener 14. The scale factor determiner 26 is provided with at least a part of a wideband finite impulse response of a pre-equalizing filter $w_u$ 50 representing the interference whitening for the user in question. In this embodiment, the interference whitener 14 is assumed to provide the wideband finite impulse response of a pre-equalizing filter in the time domain. This can be achieved either by providing the FDE filter in the time domain or to have the FDE filter in the frequency domain and provide a IFFT of that filter.

Based on at least these parts of this wideband finite impulse response of a pre-equalizing filter $w_u$ 50, the scale factor determiner 26 determines a scale factor $\kappa_u$ 52. This scale factor represents a relation between a noise floor measure before interference whitening and a noise floor measure after interference whitening for a specific user u. In terms of the mathematical expressions further above, the scale factor $\kappa_u$ equals $$\sum_{l=0}^{L-1} w_u^H(l) w_u(l).$$

A noise floor compensator 28 is connected to the output of the scale factor determiner 26 and the output of the noise floor estimator 24, and is configured for compensating the estimate of a noise floor measure 48 by the scale factor 52 for the user u into a corrected noise floor measure 54 $C\hat{N}_u$ for the user u. The processor 20 of this embodiment is thus configured for compensating the noise floor measure for effects caused by the interference whitening.

The processor 20 further comprises a noise rise calculator 32, connected to the power meter 30 and the noise floor compensator 28. The noise rise calculator 32 is configured for calculating a noise rise measure 58 $NR_u$ per user u. This calculation is based at least on the useful signal power per user 56 $P_u$ and the corrected noise floor measure 54 for user u. In this way a collection of user specific noise rise measures is obtained.

For most load estimation purposes, however, a total noise rise measure is typically more useful. Therefore, in the present embodiment, the noise rise estimator arrangement 55 of the processor 20 is further configured for combining these noise rise measure per user 58 into a total noise rise measure 60 NR, in a noise rise combiner 34.

How the loads optimally should be combined over different users depends to some extent on the application. In a typical scenario, it is likely that it is the user that experiences the highest load that limits the uplink. A useful total noise rise measure could then be such a maximum load among the users. In mathematical terms, it becomes:

$$RoT = \max_u RoT_u^{FDE}. \tag{14}$$

In an alternative embodiment, the maximum load can be searched within a subset of the users. Such a subset of users could e.g. exclude users not having any benefit from FDE or users that are known not to cause any abrupt large changes in load.

In another embodiment, the total noise rise measure can be defined as the average noise rise measure of the users, or any subset of users. This may be expressed as:

$$RoT = \frac{1}{u_p}\sum_{k=1}^{u_p} RoT_k^{FDE}, \tag{15}$$

where $u_p$ is the number of users of the subset.

Alternatives to this could be to look for a certain percentile of the distribution of user specific noise rise measures.

Figure 6B:
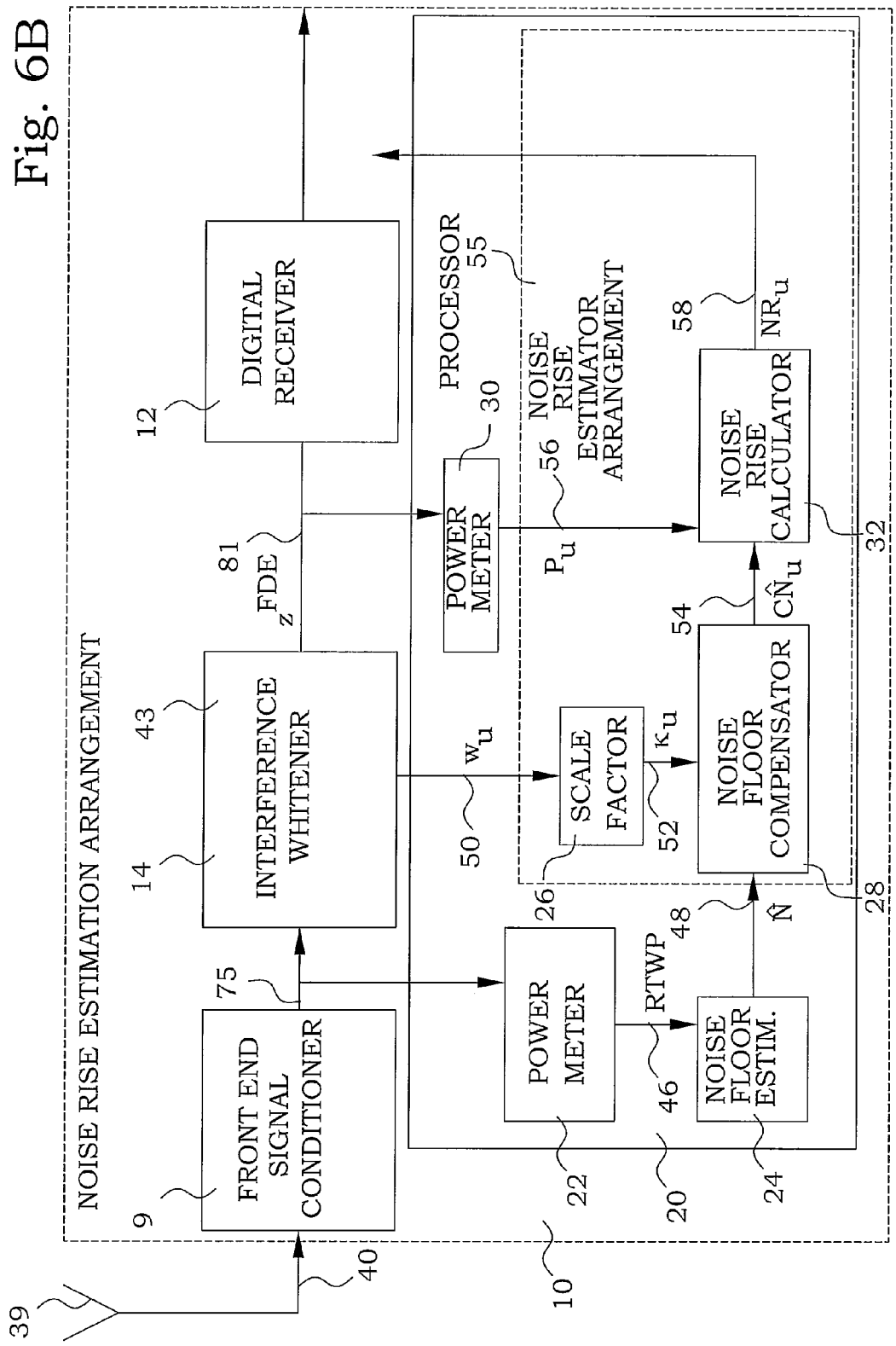

In another embodiment, the noise rise combiner 34 can be totally omitted, as shown in FIG. 6B. The parts of the communication system using the noise rise measure then has to operate with user specific noise rise measures or may have their own combining equipment. Also in the other embodiments illustrated below, the noise rise combiner 34 can be totally omitted.

In the embodiment of FIG. 6A, the different functionalities of the processor 20 are illustrated as separate part units. However, anyone skilled in the art realises that the functionalities can be configured and realised in different manners, separately or integrated, fully or partly. The part units associated with the different functionalities should therefore only be considered as separate units concerning their functionality.

The scale factor determiner 26, the noise floor compensator 28, the noise rise calculator 32 and the noise rise combiner 34, if any, together form the noise rise compensator arrangement 55. The noise rise compensator arrangement 55 is supplied with the noise floor estimation 48, the wideband finite impulse response 50 and the useful signal power per user 56 and provides a compensated noise rise measure. The scale factor can in different embodiments be used in different manners in the actual calculation. The effects caused by the interference whitening can be compensated by compensating of at least one of the equivalent total wideband power, the noise floor measure and a ratio between the equivalent total wideband power and the noise floor measure. Typically, only one of the quantities has to be compensated, however, in theory it would be able to e.g. compensate one factor for half the interference whitening effect and another factor for the other half. However, such solutions are only mathematical equivalences. Such equivalences are easily understood by referring to the mathematical description further above.

Figure 6C:
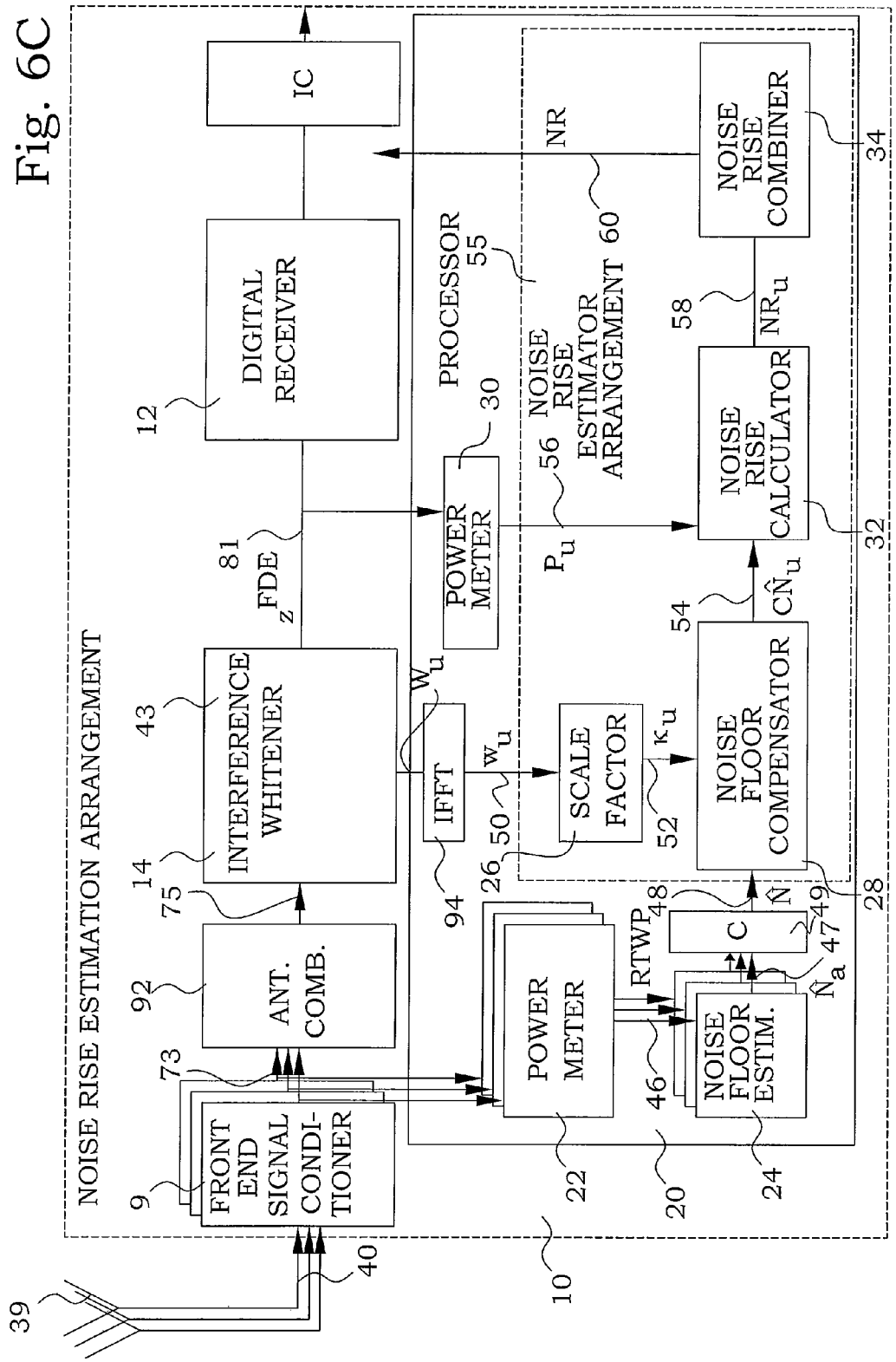

In many systems, a plurality of antennas is used. These antennas can be utilized for different kinds of purposes, such that Rx diversity and uplink MIMO reception. In FIG. 6C, the arrangement 10 for noise rise estimation comprises a plurality of antenna systems 39. The different signals 40 from the antenna system are received in respective front end signal conditioners 9, typically performing sampling, filtering and similar processes. An antenna combiner 92 receives the signals 73 of the individual antennas and combines them into one common signal 75, which in turn is provided to the interference whitener 14.

The processor in this embodiment has a number of power meters 22, one for each antenna arrangement, configured for measuring received total wideband power 46 (RTWP) of the signals 73 from each antenna received from the front end signal conditioner 9 a plurality of times. In other words, the processor is configured for measuring received total wideband power for each one of a plurality of antennas. These measured received total wideband powers 46 are provided at an output from respective power meter 22. The processor 20 has further a number of noise floor estimators 24 connected to the output of a respective power meter 22. The noise floor estimators 24 are configured for computing an estimate of an antenna noise floor measure 47 of the associated antenna arrangement based on at least a number of the measured received total wideband powers 46 of that antenna. In other words, the processor is configured for computing an estimate of an antenna noise floor measure 47 based on at least a number of the measured received total wideband powers for the each one of the plurality of antennas. The processor 20 in this embodiment further comprises a noise floor combiner 49, connected to outputs from the noise floor estimators 24. The noise floor combiner 49 adds the individual antenna noise floor measures 47 $\hat{N}_a$ together in to a total noise floor measure 48 $\hat{N}$. In other words, the processor in this embodiment is configured for summing the noise floor measures for each one of the plurality of antennas into a noise floor measure for all antennas.

The remaining parts of the arrangement 10 for noise rise estimation may be configured in the same way as described before. However, in this particular embodiment, the interference whitener 14 operates its FDE filter in the frequency domain. The wideband finite impulse response of the pre-equalizing filter $W_u$ is thereby provided in the frequency domain and an IFFT 94 of the processor 20 converts it into wideband finite impulse response of the pre-equalizing filter $w_u$ 50 of the time domain.

For simplifying the figures and description, only single antenna embodiments are described here below. However, the multi-antenna concept can be applied to all embodiments disclosed herein, by providing corresponding features as was described above.

Similarly, for simplifying the figures and description, only embodiments in which the wideband finite impulse response of the pre-equalizing filter $w_u$ is provided in the time domain are described here below. However, the conversion of the wideband finite impulse response of the pre-equalizing filter as presented here above can be applied to all embodiments disclosed herein, by providing corresponding features as was described above.

Figure 6D:
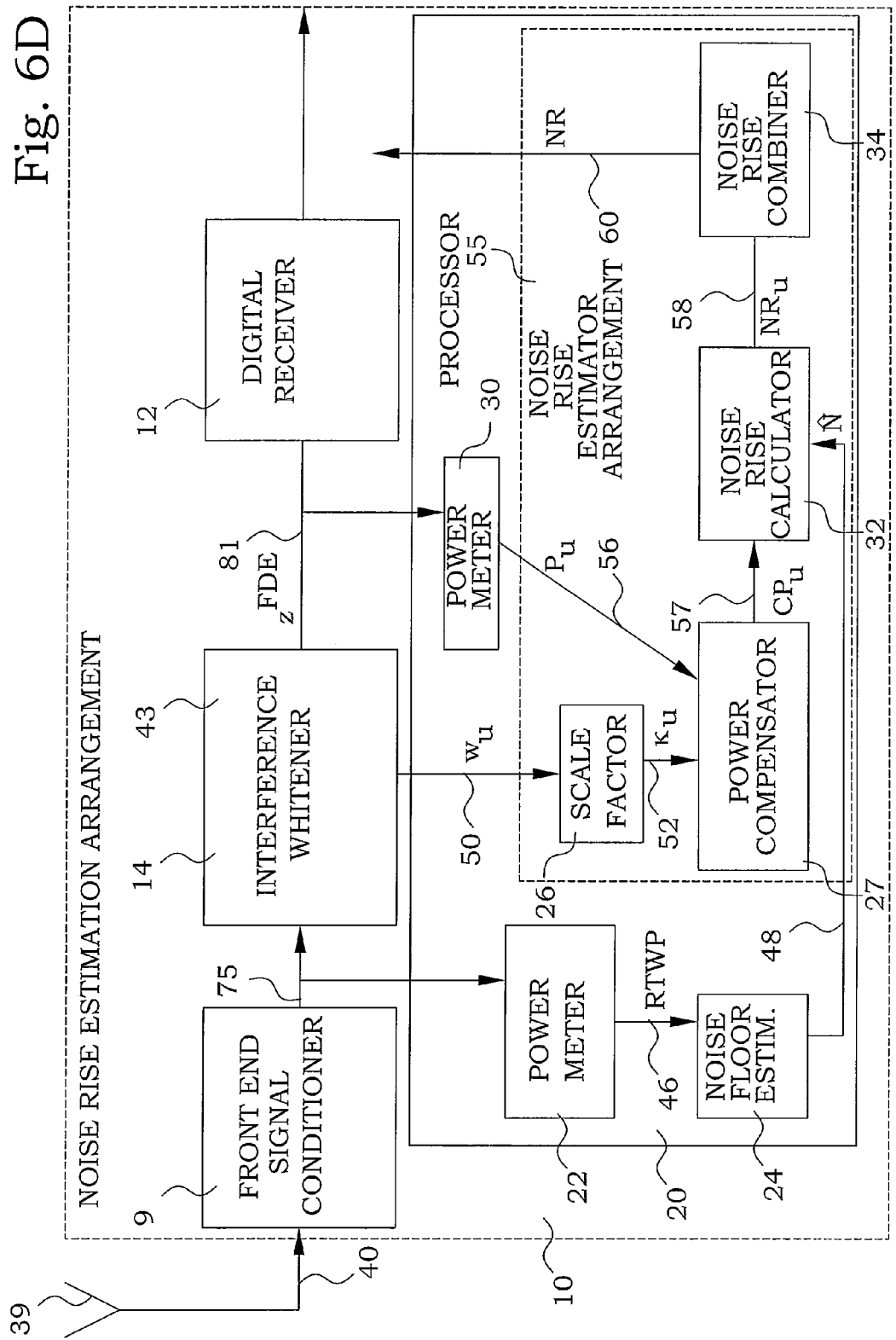

FIG. 6D illustrates an embodiment where the compensation for the effect of the interference whitener instead is performed on the useful signal power per user 56. The useful signal power per user 56 $P_u$ and the scale factor $\kappa_u$ 52 are provided to a power compensator 27. The power compensator 27 provides a compensated user power measure $CP_u$ 57, which is a scaling of the useful signal power per user 56 $P_u$ by division with the scale factor $\kappa_u$ 52. The compensated user power measure $CP_u$ 57 and the uncompensated noise floor measure 48 are provided as inputs to the noise rise calculator 32 for provision of the correct noise rise measure 58 per user. In other words, in the present embodiment, the processor 20 is configured for compensating the useful signal power per user for effects caused by the interference whitening.

Figure 6E:
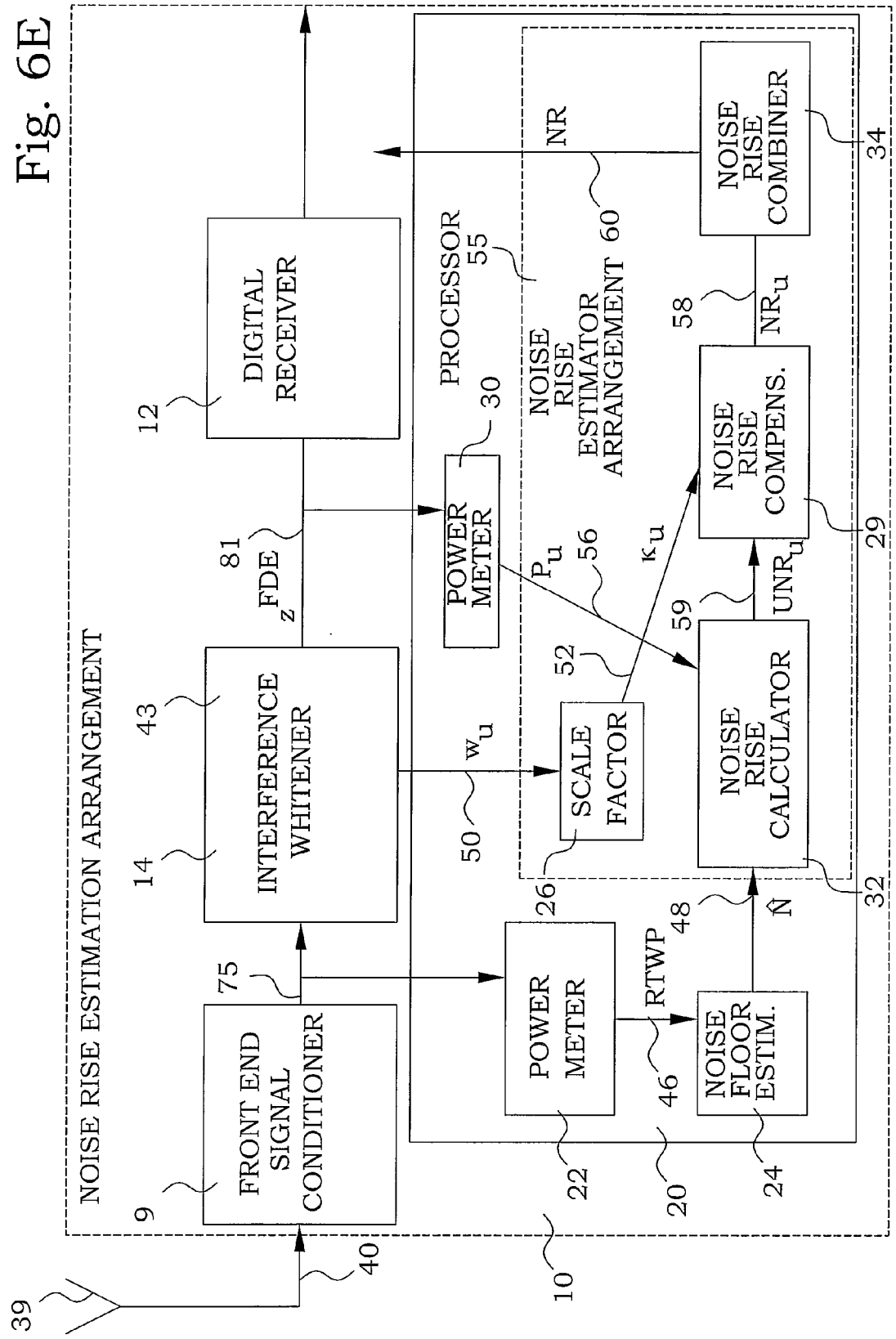

FIG. 6E illustrates another embodiment where the compensation for effects caused by the interference whitening is performed on the noise rise measure instead, i.e. the ratio between the useful signal power per user and the noise floor measure. The useful signal power per user 56 and the uncompensated noise floor measure 48 are provided as inputs to the noise rise calculator 32. The output from the noise rise calculator 32 then becomes an uncorrected noise rise measure 59 $UNR_u$ for user u. This uncorrected noise rise measure 59 is provided together with the scale factor $\kappa_u$ 52 to a noise rise compensator 29, where the compensation for the interference whitening effects is performed by a division, and a corrected noise rise measure 58 per user is output. In other words, in the present embodiment, the processor 20 is configured for compensating a ratio between the useful signal power per user and the noise floor measure for effects caused by the interference whitening.

Figure 7A:
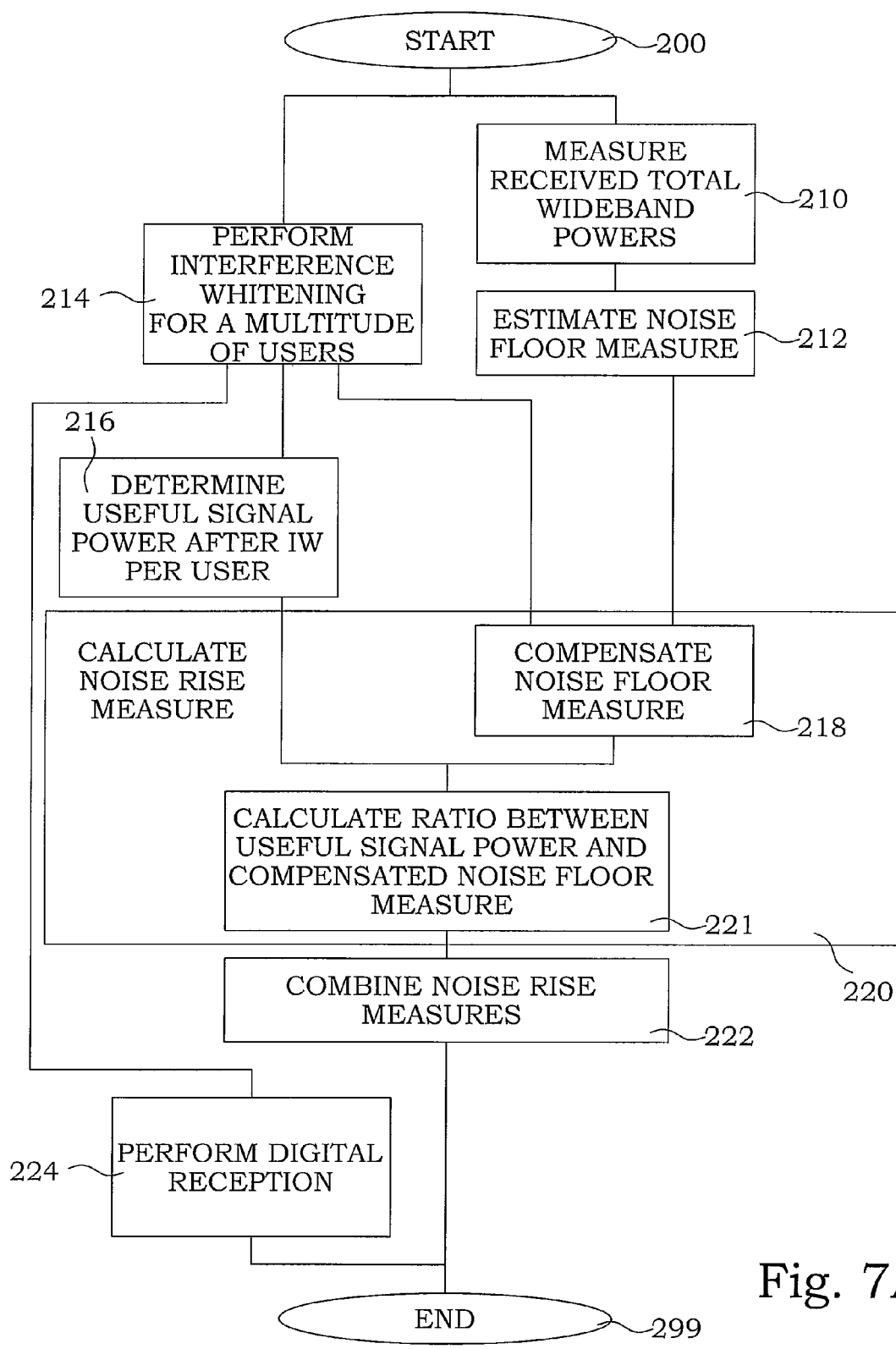
FIGS. 7A-E are flow diagrams of steps of embodiments of noise rise estimation methods according to the present invention.

FIG. 7A illustrates a flow diagram of steps of an embodiment of a method according to the present invention. The method for noise rise estimation in a wireless communication system begins in step 200. In step 210, received total wideband power is measured a plurality of times. An estimate of a noise floor measure is computed in step 212, based on at least a number of the measured received total wideband powers. In step 214, which can be performed before, during, interleaved with or after steps 210 and 212, an interference whitening is performed, specific for each one of a plurality of users. The interference whitening is in this embodiment is a minimum mean square error frequency domain equalization.

In step 216, a useful signal power per user after the interference whitening is determined. In step 218, which can be performed before, during, interleaved with or after step 216, the estimate of a noise floor measure is compensated for the effects of the interference whitening into a compensated noise floor measure. Preferably, this step of compensating 218 the estimate of a noise floor measure comprises calculation of a scale factor representing a relation between a noise floor measure before interference whitening and a noise floor measure after interference whitening. This scale factor is specific for each user. In an even more preferred embodiment, the scale factor $\kappa_u$ is calculated based on at least a part of a wideband finite impulse response of a pre-equalizing filter representing the interference whitening in a minimum mean square error frequency domain equalization. More detailed descriptions are provided further above, but in one embodiment, the scale factor $\kappa_u$ is calculated according to $$\kappa_u = \sum_{l=0}^{L-1} w_u^H(l) w_u(l),$$

where w(l) is the wideband finite impulse response of said pre-equalizing filter. Then, a noise rise measure is calculated in step 221 based at least on the useful signal power per user and the compensated noise floor measure, in this embodiment by calculating a ratio between the useful signal power per user and the compensated noise floor measure.

Steps 218 and 221 together form a general step of calculating 220 a noise rise measure. This calculation is based at least on said useful signal power per user and said noise floor measure and comprises compensating of the noise rise measure per user for the interference whitening. In the present embodiment, the compensating comprises compensating of the noise floor measure for effects caused by the interference whitening. The step 200 may in other embodiments be configured somewhat differently.

After the calculation 220 of a noise rise measure, the procedures continues in this embodiment to step 222, where the noise rise measure per user is combined into a total noise rise measure. As was discussed in connection to the arrangements further above, such combining can be performed in a number of different ways to obtain a total noise rise measure being generally valid for the whole arrangement.

Figure 7B:
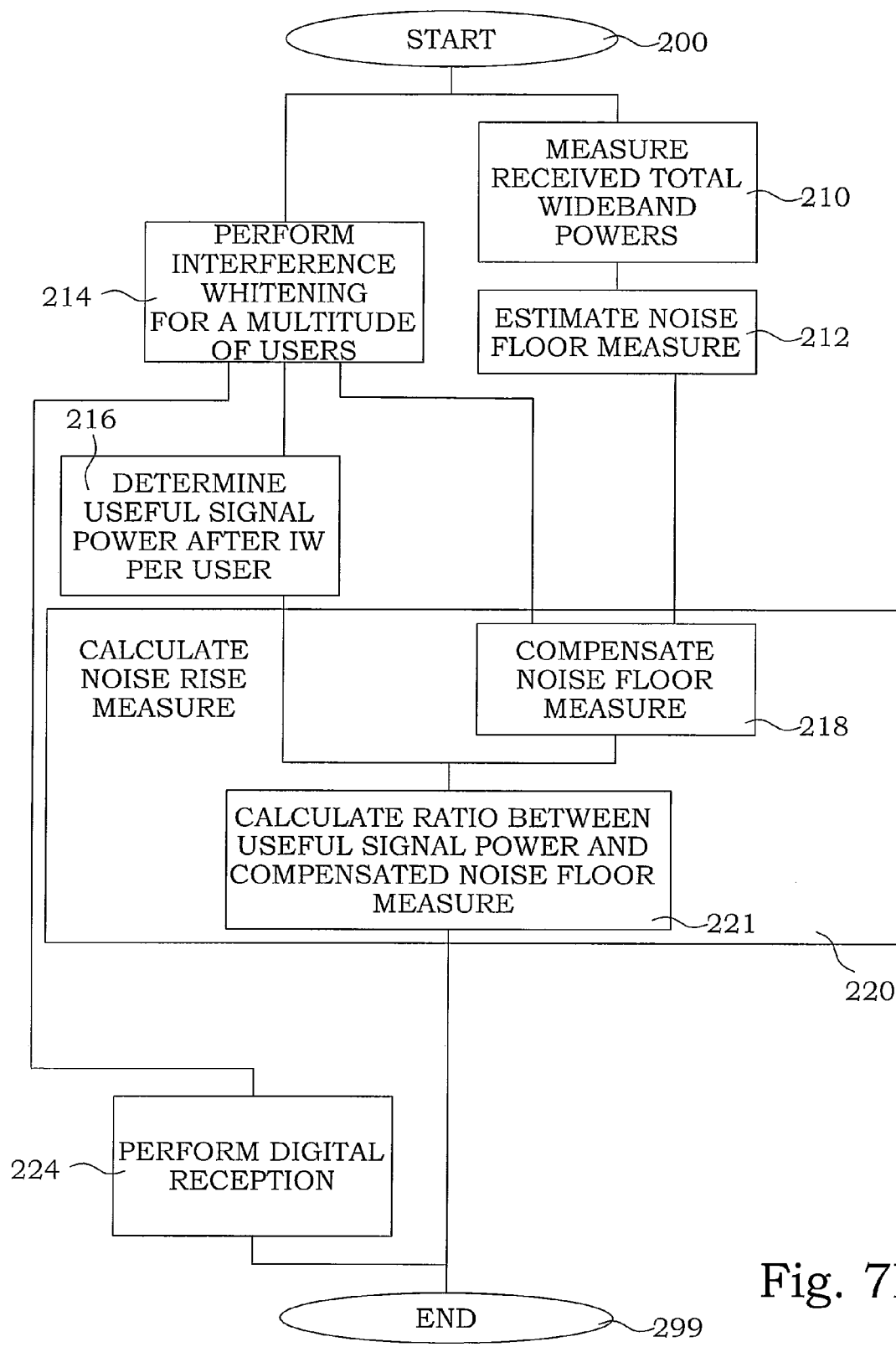

Alternatively, the step 22 may be omitted, as illustrated in the flow diagram of FIG. 7B.

In the embodiment of FIG. 7A, the procedure of receiving signals also typically comprises the step 224, where the actual digital reception is performed. In other words, the procedure comprises the step of processing 224 the total received signal after the interference whitening in a digital receiver. The procedure ends in step 299.

Figure 7C:
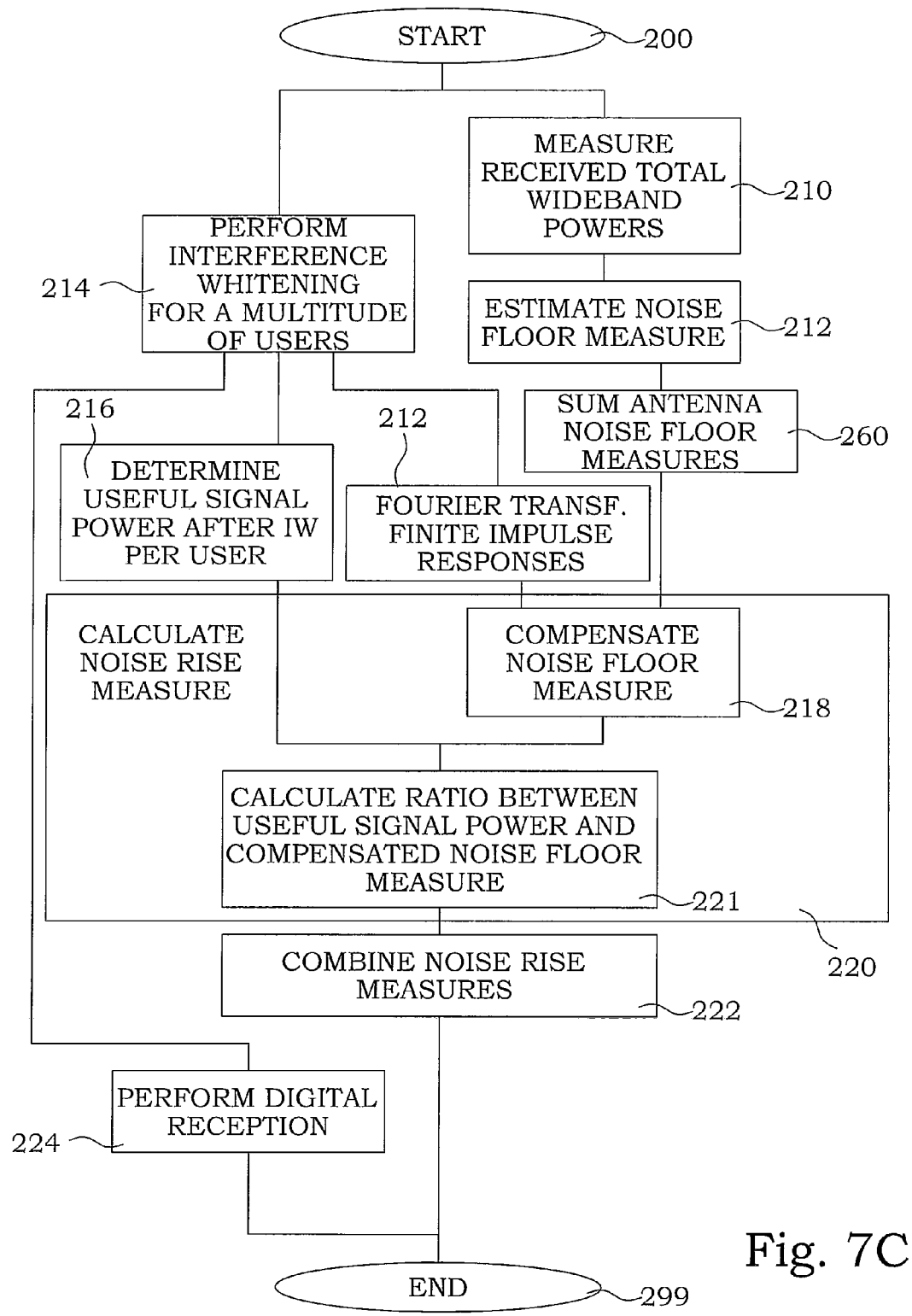

In the case the present method is applied on a system with multiple antennas, as is the case in the flow diagram of FIG. 7C, the steps 210 and 212 are adapted accordingly. Step 210 here comprises measuring of received total wideband power for each one of a plurality of antennas. The step 212 here comprises computing of an estimate of a noise floor measure based on at least a number of the measured received total wideband powers for each one of the plurality of antennas. The procedure furthermore comprises the additional step 260 of summing the noise floor measures for each one of the plurality of antennas into a common noise floor measure for all antennas. This noise floor measure, being representative for all antennas as a group, is then used as the noise floor measure to be used in the further procedure.

For making the figures more readable, the other method embodiments presented in the present disclosure are single antenna embodiments. However, the above presented ideas of changes for making the procedure adapted to multi-antenna applications can also be employed by all embodiments presented in the present disclosure by making analogue changes.

FIG. 7C also illustrates an additional step 215, in which a wideband finite impulse response of a pre-equalizing filter in the frequency domain is Fourier transformed into a wideband finite impulse response of a pre-equalizing filter in the time domain. Such a step is applicable when the interference whitening is based on a FDE filter in the frequency domain. Also such a modification can be made to all method embodiments of the present disclosure even if it is not explicitly illustrated or described.

Figure 7D:
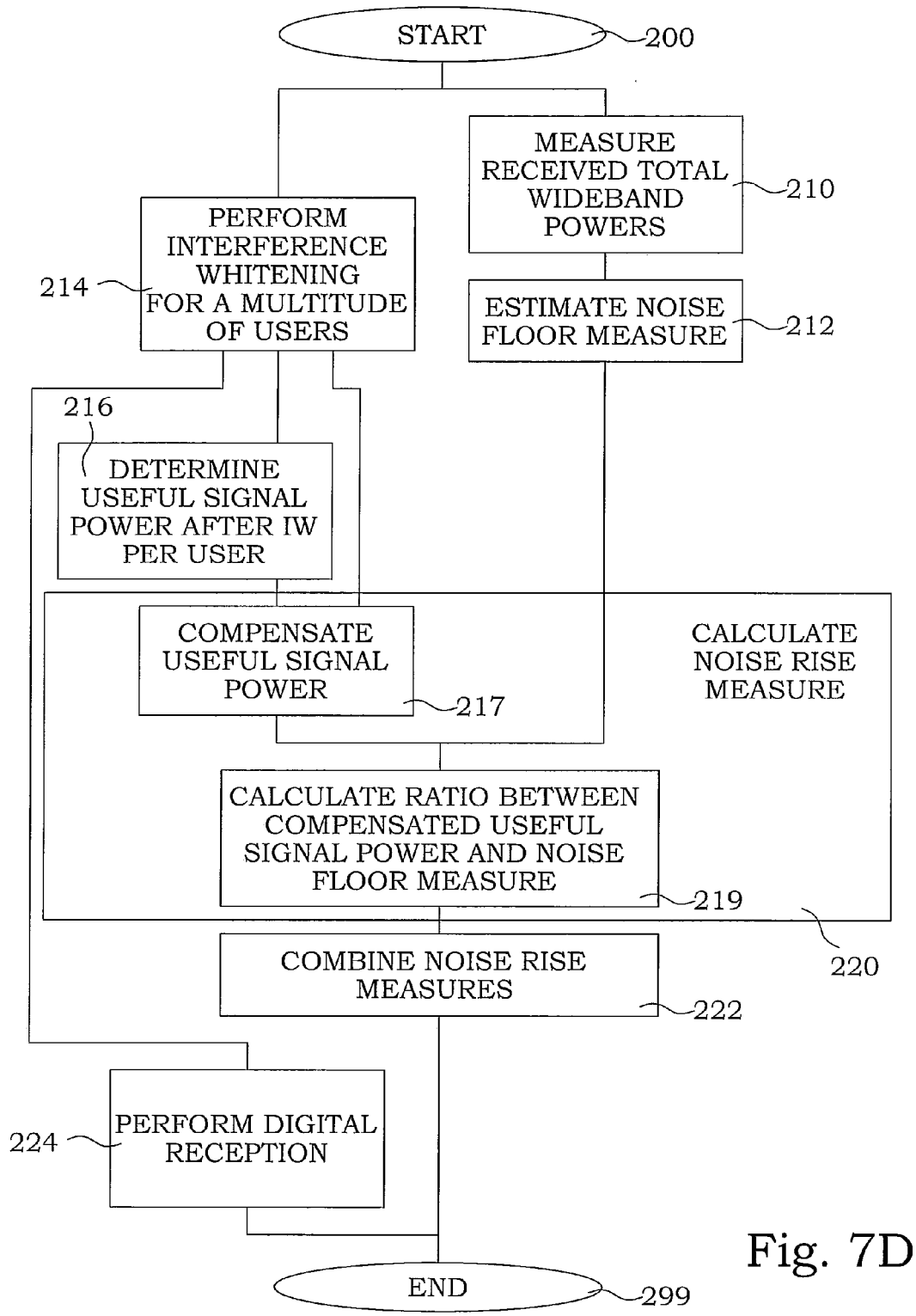

FIG. 7D illustrates another embodiment, in which step 220 of calculating a noise rise measure is configured differently. The useful signal power per user after interference whitening is here directly compensated for the effects caused by the interference whitening in step 217, giving a compensated useful signal power per user. This compensated useful signal power per user is then in step 219 used for calculating a noise rise measure per user as a ratio between the compensated useful signal power per user and the uncompensated noise floor measure achieved in step 212. In other words, the compensating of the effects of interference whitening comprises compensating of the useful signal power per user for the effects caused by the interference whitening.

Figure 7E:
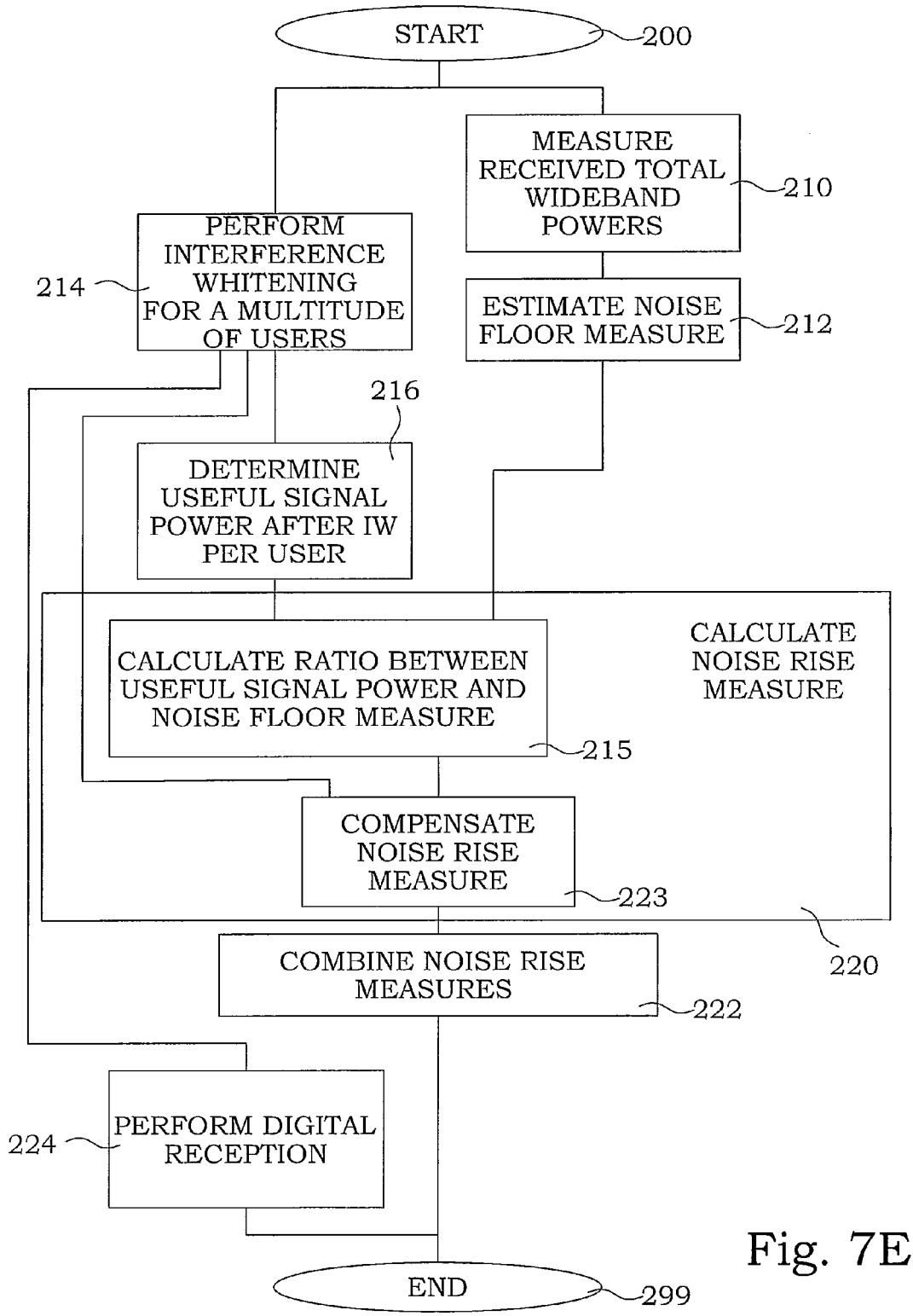

FIG. 7E illustrates yet another embodiment, in which step 220 of calculating a noise rise measure is configured differently. The useful signal power per user and the uncompensated noise floor measure are in step 215 used for calculating an uncompensated noise rise measure per user by calculating the ratio between the useful signal power per user and the uncompensated noise floor measure. This uncompensated noise rise measure is then compensated for the effects caused by the interference whitening in step 223, giving a true noise rise measure. In other words, the compensation comprises compensating a ratio between the useful signal power per user and the noise floor measure, for effects caused by the interference whitening.

Today, it is common practice to implement the computationally most intense parts of the WCDMA uplink radio receivers on application specific integrated circuits (ASICs). Typically, such ASICs provides FDE processing for a multitude of users, using dedicated hardware. It is e.g. previously known to implement channel estimation, weight combining, demodulation and decoding on such ASICS, for multiple users. To achieve this, the ASICS may be equipped with dedicated accelerators e.g. for TURBO decoding, matrix operations and similar. This is facilitated by the fact that ASICS can be programmed to perform different tasks, exploiting a variety of such hardware accelerator resources. To our knowledge, prior to the present invention, dedicated processing means for load estimation has however not been implemented on ASICS.

In a preferred embodiment of an arrangement for noise rise estimation in a wireless communication system, at least a part of the functionality of the processor as illustrated in FIGS. 6A-E is implemented by at least one of an Application Specific Integrated Circuit (ASIC) and a Digital Signal Processor (DSP). The embodiment presents ASIC implementation of at least a subset of the above described functionality.

Embodiments of the invention discloses techniques that allow for load estimation that reflects the IS gains of FDE, thus enhancing coverage, capacity and cell throughput at system level. Without the disclosed invention, large parts of the gains associated with FDE would not materialize, due to the need to use too conservative margins. The apparatuses according to preferred embodiments of the present invention also have a relatively low computational complexity. In embodiments of the present invention the load for the whole cell is processed simultaneously, thereby making it possible to reuse some of the load estimation functionality.

In the embodiments above, the interference whitener is exemplified as a minimum mean square error frequency domain equalization equalizer. However, also other interference whitener procedures that are applied in the receiver chain before the digital receiver and which are user specific, are also possible to use in the present concept. The main steps at a general level will still be applicable, while the detailed mathematical considerations have to be adapted accordingly.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

AGC—Automatic Gain Control
ASIC—Application Specific Integrated Circuits
DSP—Digital Signal Processor
EUL—Enhanced UpLink
FDE—Frequency Domain Equalization
FFT—Fast Fourier Transform
HW—Hardware
IC—Interference Cancellation
IFFT—Inverse Fast Fourier Transform
IS—Interference Suppression
LTE—Long-Term Evolution
MMSE—Minimum Mean Square Error
RBS—Radio Base Station
RNC—Radio Network Controller
RoT—Rise over Thermal
RTWP—Received Total Wideband Power
SIR—Signal to Interference Ratio
SRNC—Serving Radio Network Controller
TTI—Transmission Time Interval
UE—User Equipment
WCDMA—Wideband Code Division Multiple Access

The invention claimed is:

1. A method for noise rise estimation in a wireless communication system, said method comprising the steps of:
measuring received total wideband power of an antenna a plurality of times; computing an estimate of a noise floor measure based on at least a number of said measured received total wideband powers of an antenna, wherein said measuring comprises measuring of received total wideband power for each one of a plurality of antennas, and wherein said computing comprises computing an estimate of a noise floor measure based on at least a number of said measured received total wideband powers for said each one of said plurality of antennas and further comprises summing said noise floor measures for said each one of said plurality of antennas into a noise floor measure for all antennas;
performing interference whitening of a received signal per user for a multitude of users; determining a useful signal power per user after said interference whitening; and
calculating a noise rise measure per user, based at least on said useful signal power per user and said noise floor measure, wherein said calculating comprises compensating the noise rise measure per user for said interference whitening.

2. The method of claim 1, further comprising combining said noise rise measure per user into a total noise rise measure.

3. The method of claim 1, further comprising processing said total received signal after said interference whitening in a digital receiver.

4. The method of claim 1, wherein said compensating comprises compensating of said useful signal power per user for effects caused by said interference whitening.

5. The method of claim 1, wherein said compensating comprises compensating of said noise floor measure for effects caused by said interference whitening.

6. The method of claim 1, wherein said compensating comprises compensating of a ratio between said useful signal power per user and said noise floor measure for effects caused by said interference whitening.

7. The method of claim 1, wherein said interference whitening is a minimum-mean-square-error frequency-domain equalization.

8. The method of claim 1, wherein said compensating comprises calculation of a scale factor $\kappa_u$ representing a relation between a noise floor measure before interference whitening and a noise floor measure after interference whitening.

9. The method of claim 8, wherein said scale factor $\kappa_u$ is calculated based on a wideband finite impulse response of a pre-equalizing filter in a minimum-mean-square-error frequency-domain equalization.

10. The method of claim 9, wherein said scale factor $\kappa_u$ is calculated according to:

$$\kappa_u = \sum_{l=0}^{L-1} w_u^H(l) w_u(l)$$

where $w_u(l)$ is said wideband finite impulse response of said pre-equalizing filter.

11. An apparatus for noise rise estimation in a wireless communication system, the apparatus comprising:
a front end signal conditioner;
an interference whitener connected to said front end signal conditioner, said interference whitener being configured to provide interference whitening of a plurality of user signals of said front end signal at an output;
a processor connected to said front end signal conditioner and to said output from said interference whitener, said processor being configured to:
measure received total wideband power received at said front end signal conditioner from an antenna a plurality of times, compute an estimate of a noise floor measure based on at least a number of said measured received total wideband powers of an antenna,
determine a useful signal power per user on said output from said interference whitener,
calculate a noise rise measure, based at least on said useful signal power per user and said noise floor measure, and compensate said noise rise measure for said interference whitening, and
measure received total wideband power for each one of a plurality of antennas, compute an estimate of a noise floor measure based on at least a number of said measured received total wideband powers for said each one of said plurality of antennas, and sum said noise floor measures for said each one of said plurality of antennas into a noise floor measure for all antennas.

12. The apparatus of claim 11, wherein said processor is further configured to combine said noise rise measure per user into a total noise rise measure.

13. The apparatus of claim 11, wherein said processor is further configured to: measure received total wideband power for each one of a plurality of antennas, compute an estimate of a noise floor measure based on at least a number of said measured received total wideband powers for said each one of said plurality of antennas, and sum said noise floor measures for said each one of said plurality of antennas into a noise floor measure for all antennas.

14. The apparatus of claim 11, further comprising a digital receiver connected to said output from said interference whitener.

15. The apparatus of claim 11, wherein said processor is further configured to compensate said useful signal power per user for effects caused by said interference whitening.

16. The apparatus of claim 11, wherein said processor is further configured to compensate said noise floor measure for effects caused by said interference whitening.

17. The apparatus of claim 11, wherein said processor is further configured to compensate a ratio between said useful signal power per user and said noise floor measure for effects caused by said interference whitening.

18. The apparatus of claim 11, wherein said interference whitener is a minimum-mean-square-error frequency-domain equalization equalizer.

19. The apparatus of claim 11, wherein at least said processor is implemented by at least one of an application-specific integrated circuit and a digital signal processor.

20. A radio base station of a wireless communication system, the radio base station comprising:
a front end signal conditioner;
an interference whitener connected to said front end signal conditioner, said interference whitener being configured to provide interference whitening of a plurality of user signals of said front end signal at an output;
a processor connected to said front end signal conditioner and to said output from said interference whitener, said processor being configured to:
measure received total wideband power received at said front end signal conditioner from an antenna a plurality of times, compute an estimate of a noise floor measure based on at least a number of said measured received total wideband powers of an antenna,
determine a useful signal power per user on said output from said interference whitener, calculate a noise rise measure, based at least on said useful signal power per user and said noise floor measure, and compensate said noise rise measure for said interference whitening,
measure received total wideband power for each one of a plurality of antennas, compute an estimate of a noise floor measure based on at least a number of said measured received total wideband powers for said each one of said plurality of antennas, and sum said noise floor measures for said each one of said plurality of antennas into a noise floor measure for all antennas.

* * * * *